(12) United States Patent
Fradet

(10) Patent No.: US 12,263,951 B2
(45) Date of Patent: Apr. 1, 2025

(54) PARACHUTE HARNESS WITH LUMBAR STRAP(S)

(71) Applicant: Eric Fradet, Vence (FR)

(72) Inventor: Eric Fradet, Vence (FR)

( * ) Notice: Subject to any disclaimer, the term of this patent is extended or adjusted under 35 U.S.C. 154(b) by 177 days.

(21) Appl. No.: 18/165,719

(22) Filed: Feb. 7, 2023

(65) Prior Publication Data

US 2023/0249835 A1 Aug. 10, 2023

(30) Foreign Application Priority Data

Feb. 7, 2022 (FR) ...................................... 2201053

(51) Int. Cl.
*B64D 17/30* (2006.01)

(52) U.S. Cl.
CPC .................... *B64D 17/30* (2013.01)

(58) Field of Classification Search
CPC ................................ B64D 17/30; B64D 17/40
See application file for complete search history.

(56) References Cited

U.S. PATENT DOCUMENTS

| | | | | |
|---|---|---|---|---|
| 1,560,366 A * | 11/1925 | Ball | ....................... | B64D 17/30 244/151 R |
| 1,871,223 A * | 8/1932 | Reese | ....................... | A45F 3/10 224/648 |
| 2,141,041 A * | 12/1938 | Knight | ................... | B64D 17/30 244/151 R |
| 2,212,746 A * | 8/1940 | Nunn | .................... | A47D 13/086 119/770 |
| 2,431,358 A | 11/1947 | Wilson | | |
| 2,979,028 A | 4/1961 | Zakely | | |
| 3,279,012 A * | 10/1966 | Gold | ....................... | B64D 17/30 24/200 |
| 3,452,374 A * | 7/1969 | Turner | ................... | B63C 9/1255 441/89 |
| 3,692,263 A | 9/1972 | Pravaz | | |
| 3,757,744 A | 9/1973 | Pravaz | | |
| 4,720,064 A * | 1/1988 | Herndon | ................ | B64D 17/30 244/122 AG |
| 5,277,348 A * | 1/1994 | Reid | ...................... | B64D 17/30 244/151 R |

(Continued)

FOREIGN PATENT DOCUMENTS

| | | |
|---|---|---|
| CZ | 278 578 | 3/1994 |
| FR | 2 727 081 | 5/1996 |

(Continued)

*Primary Examiner* — Justin M Benedik
(74) *Attorney, Agent, or Firm* — NIXON & VANDERHYE

(57) ABSTRACT

Disclosed is a lumbar support system enabling the lower back to recoil during open canopy descent. The system includes at least one lumbar strap linked by a front link to the lower part of the main lift webs and arranged in such a way that same is adapted to be linked at least in one point to the back straps when arranged in a "V" shape at the rear of the parachute pack, or in two spaced-apart locations when arranged separately. After the main parachute opening, the angular pivoting of the lumbar strap performed by the transfer of the load onto the back of the user increases the respective spacing of the two main lift webs, which allows the lower back to recoil.

12 Claims, 18 Drawing Sheets

(56) References Cited

U.S. PATENT DOCUMENTS

| | | | |
|---|---|---|---|
| 7,979,919 B2* | 7/2011 | Joran | A62B 35/0018 |
| | | | 2/69 |
| 8,528,866 B2* | 9/2013 | Fradet | B64D 17/30 |
| | | | 244/148 |
| 8,708,284 B2* | 4/2014 | Gummeson | B64D 17/30 |
| | | | 244/151 R |
| 9,027,707 B2* | 5/2015 | Schierenbeck | A62B 35/0018 |
| | | | 182/6 |
| 9,586,688 B2* | 3/2017 | Blignaut | B64D 17/30 |
| 9,993,048 B2* | 6/2018 | Casebolt | A44B 11/2592 |
| 2009/0071749 A1* | 3/2009 | Burlaud | A62B 35/04 |
| | | | 57/210 |
| 2011/0127381 A1* | 6/2011 | Fradet | B64D 17/30 |
| | | | 244/151 R |
| 2023/0249835 A1* | 8/2023 | Fradet | B64D 17/30 |
| | | | 244/151 A |

FOREIGN PATENT DOCUMENTS

| | | |
|---|---|---|
| FR | 2 950 606 | 4/2011 |
| GB | 247062 | 2/1926 |
| RU | 2 108 271 | 4/1998 |

* cited by examiner

[Fig. 1]
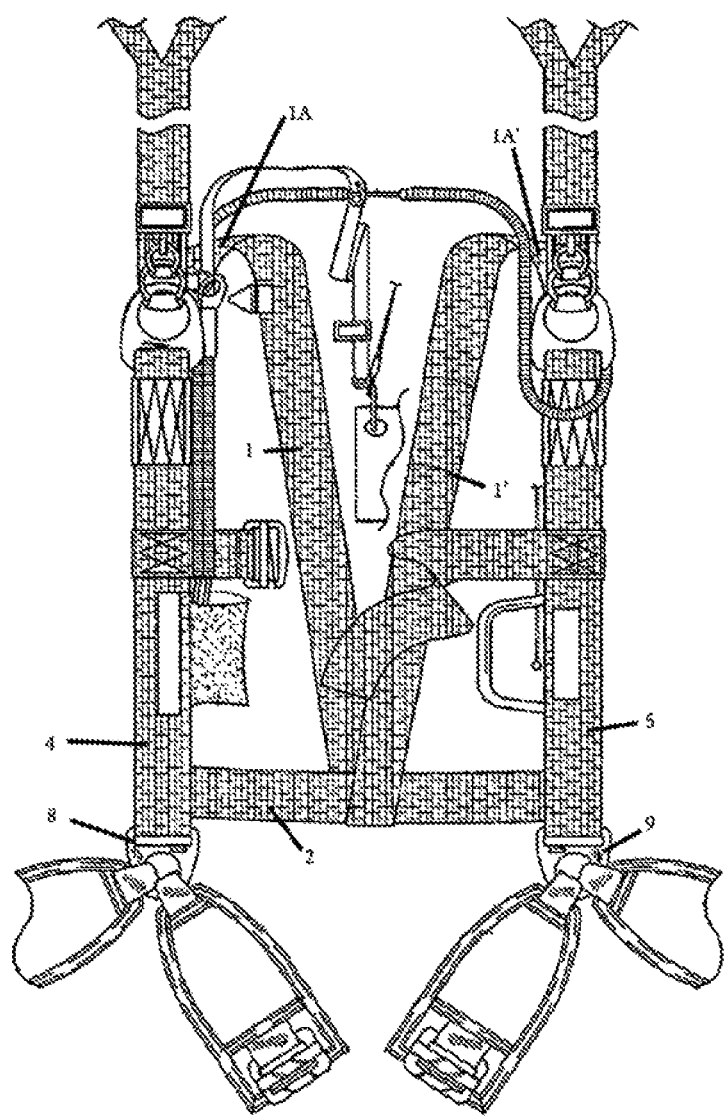

[Fig. 2]
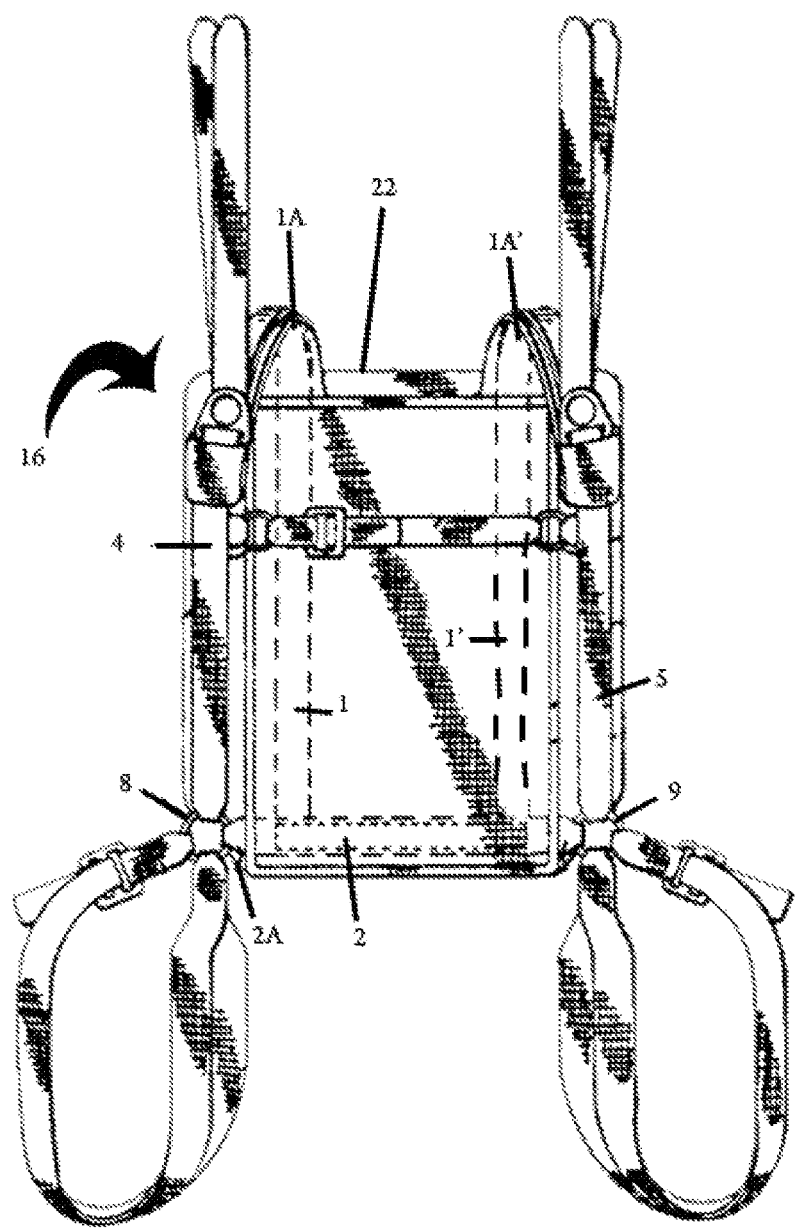

[Fig. 2A]
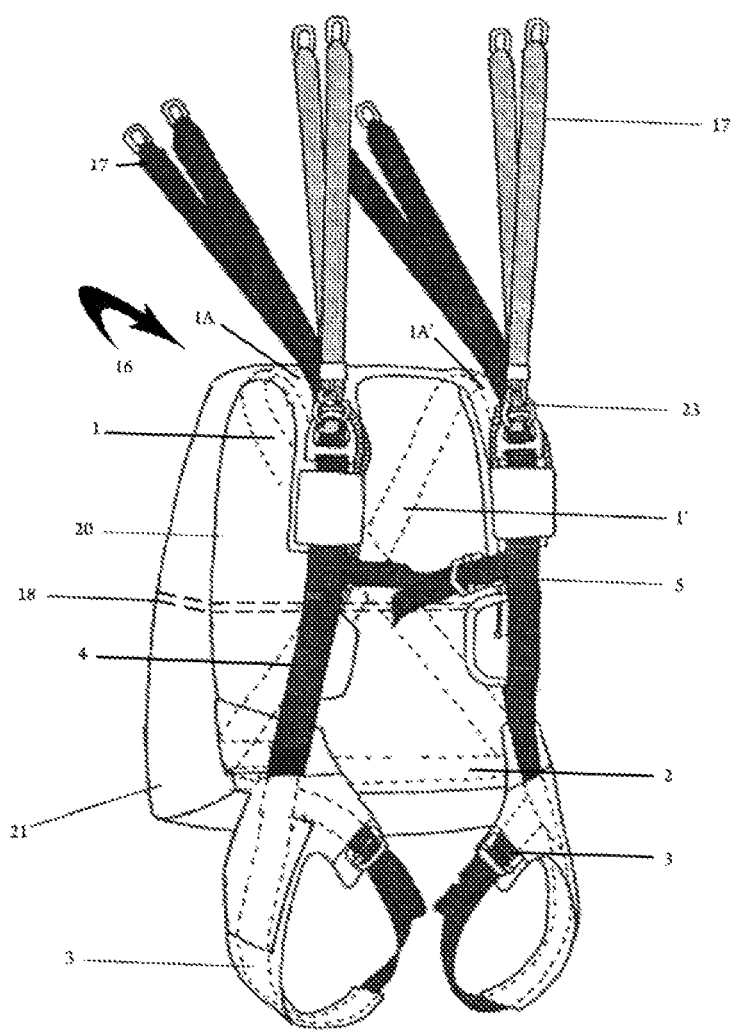

[Fig. 3]
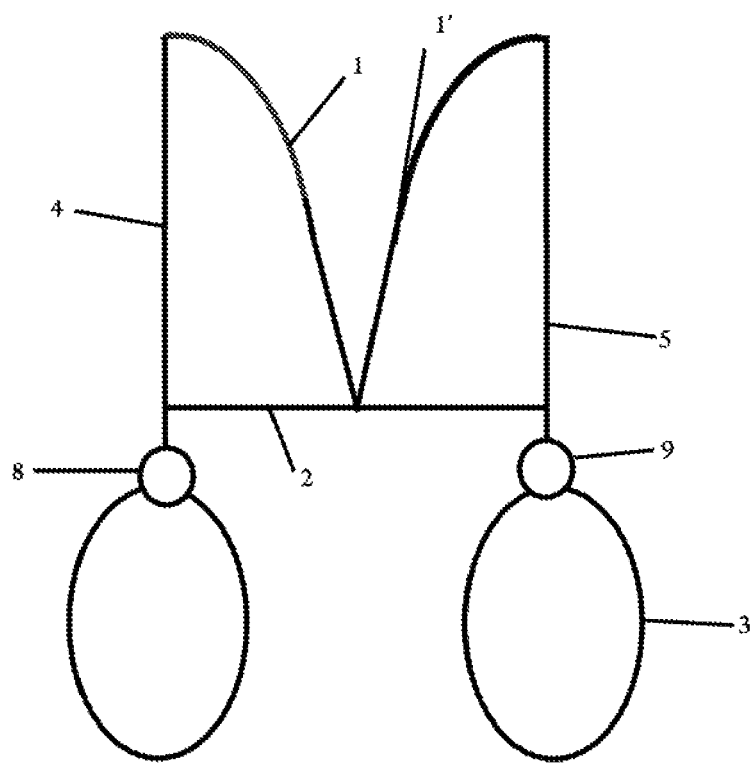

[Fig. 3A]
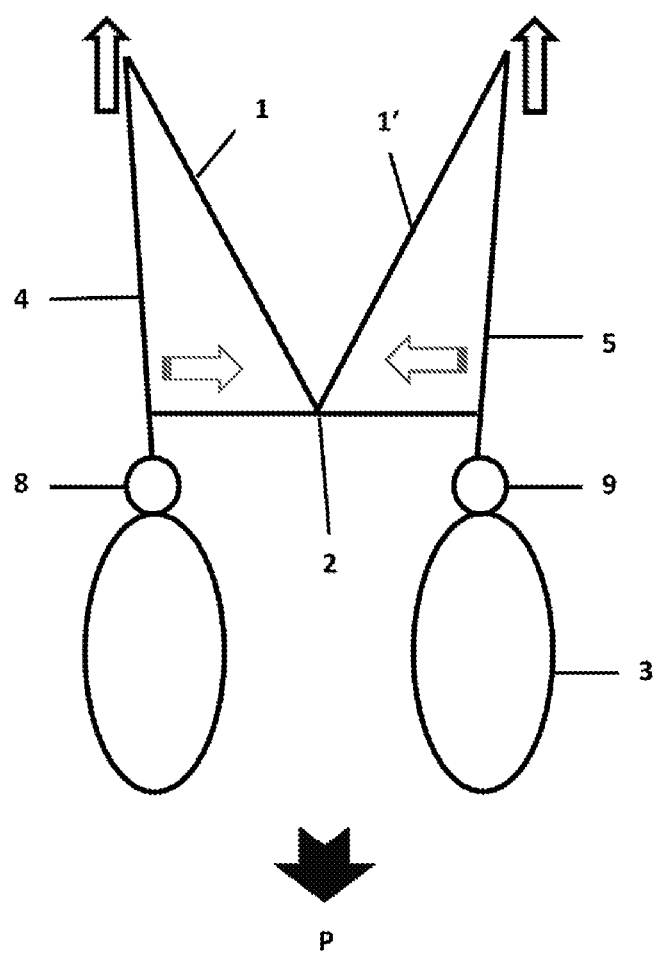

[Fig. 4]
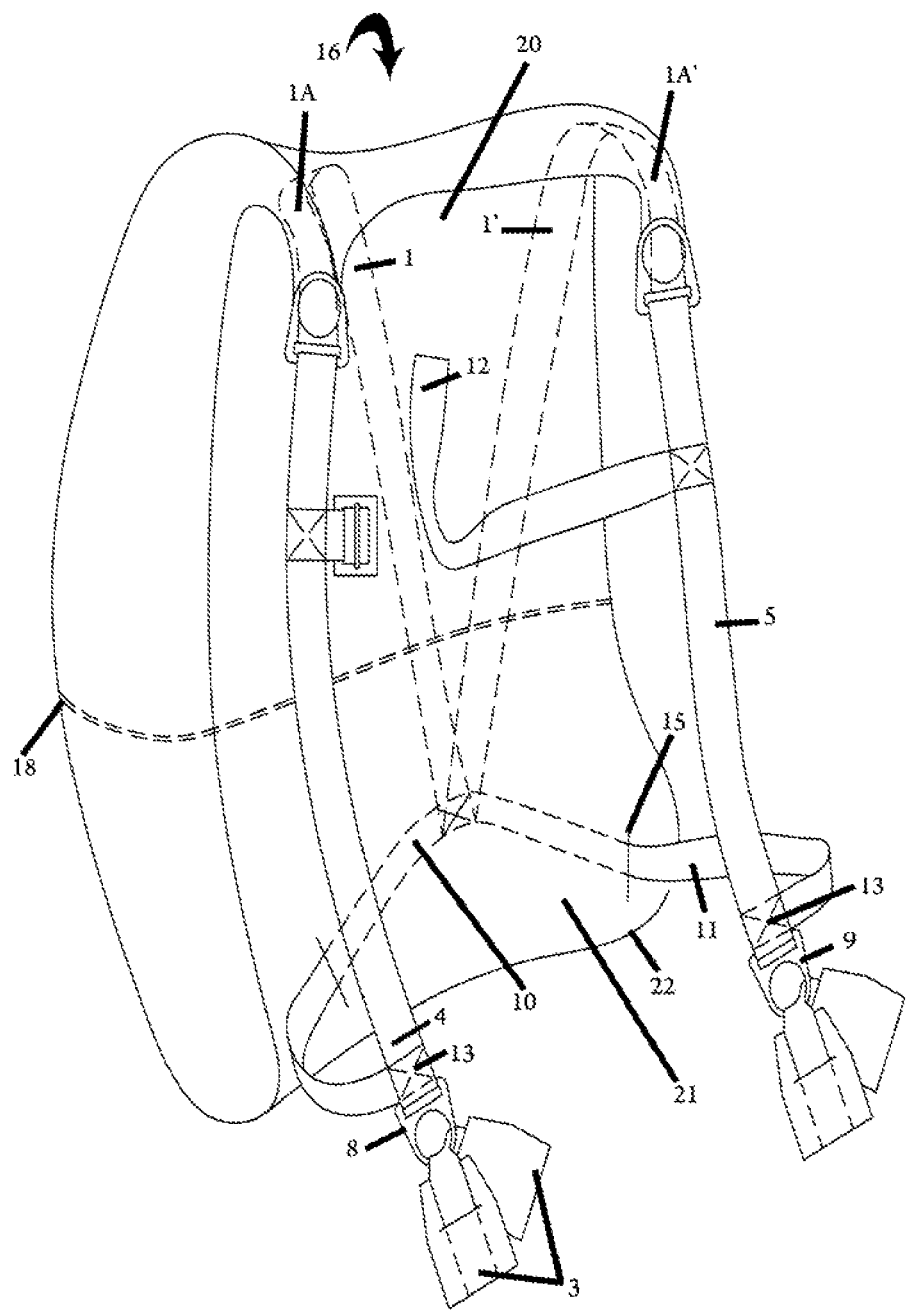

[Fig. 5]
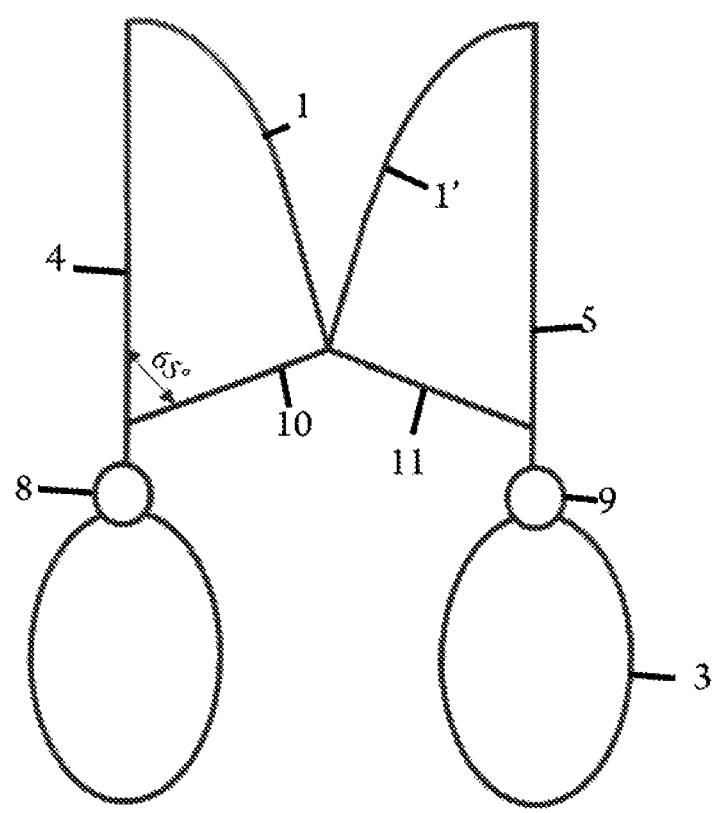

[Fig. 5A]
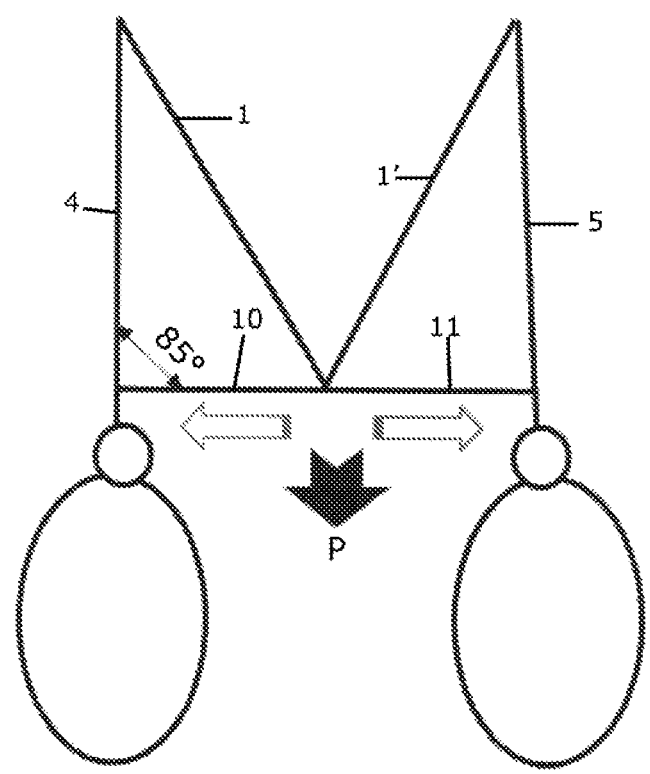

[Fig. 6]
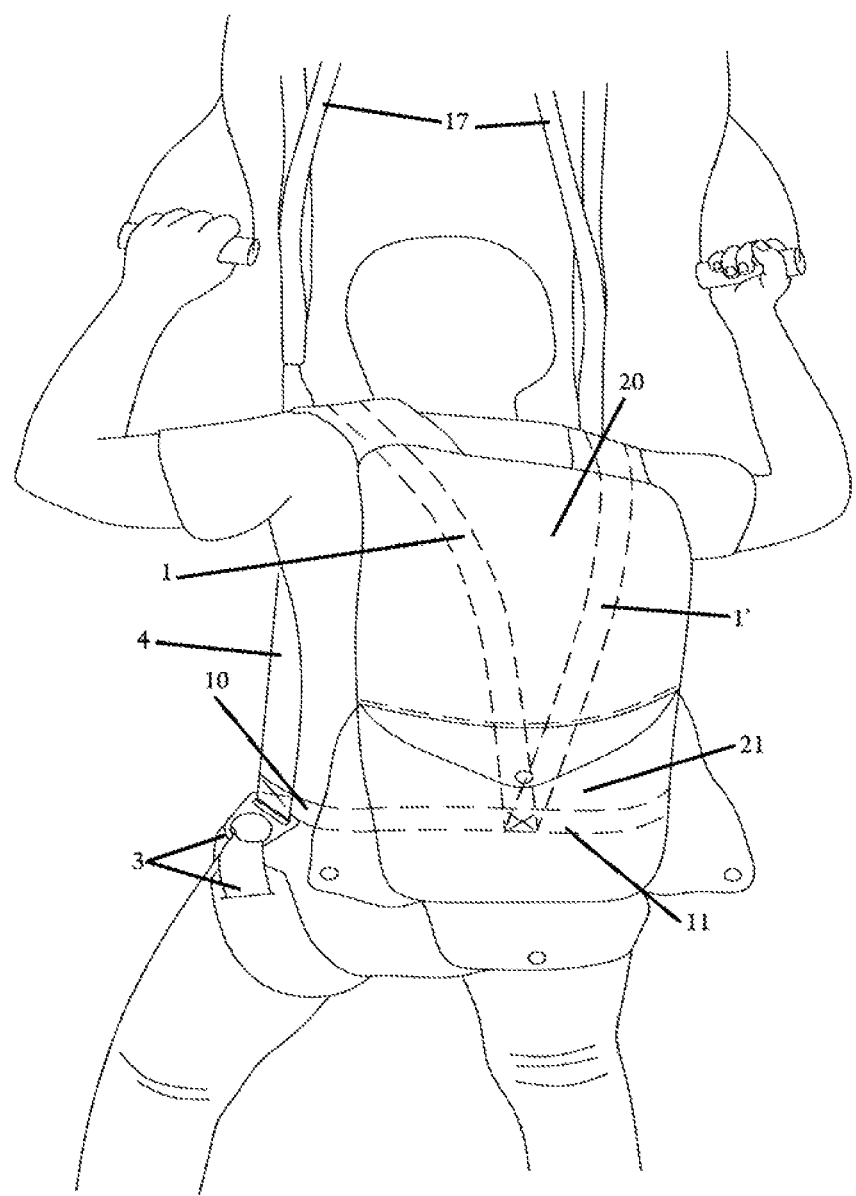

[Fig. 7]
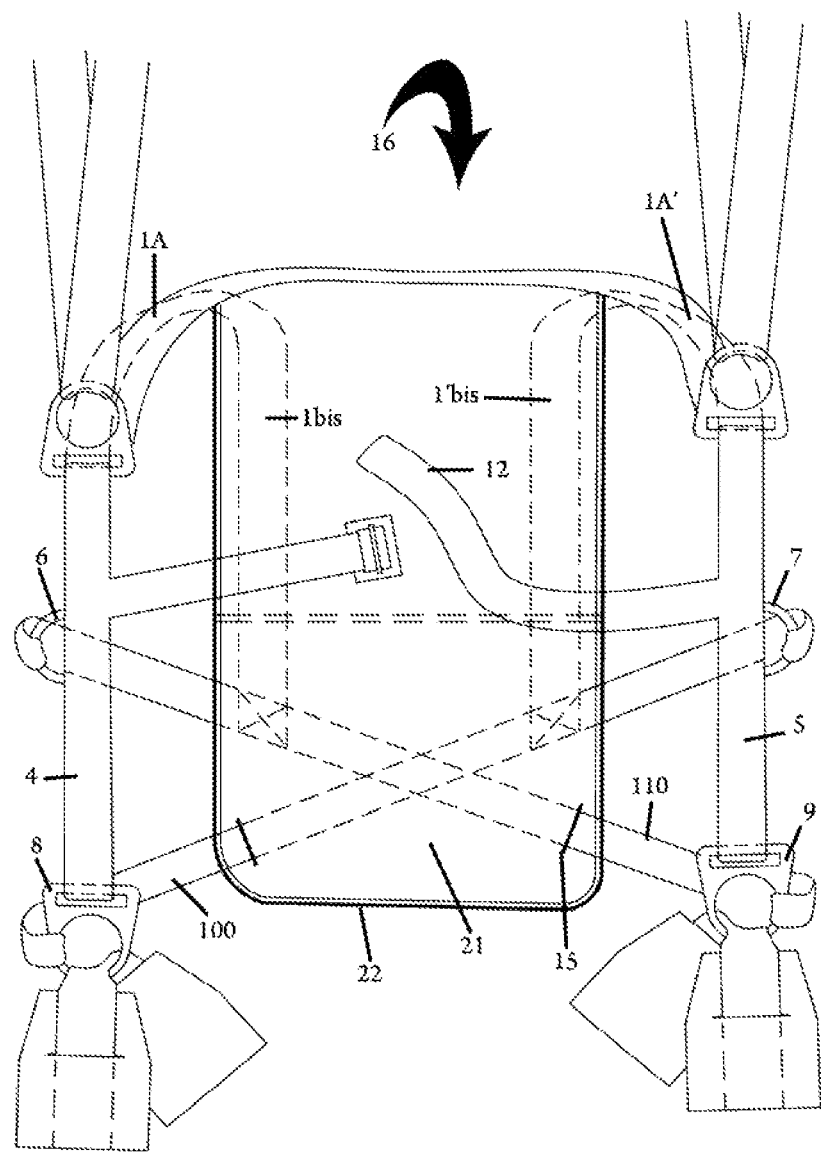

[Fig. 7A]
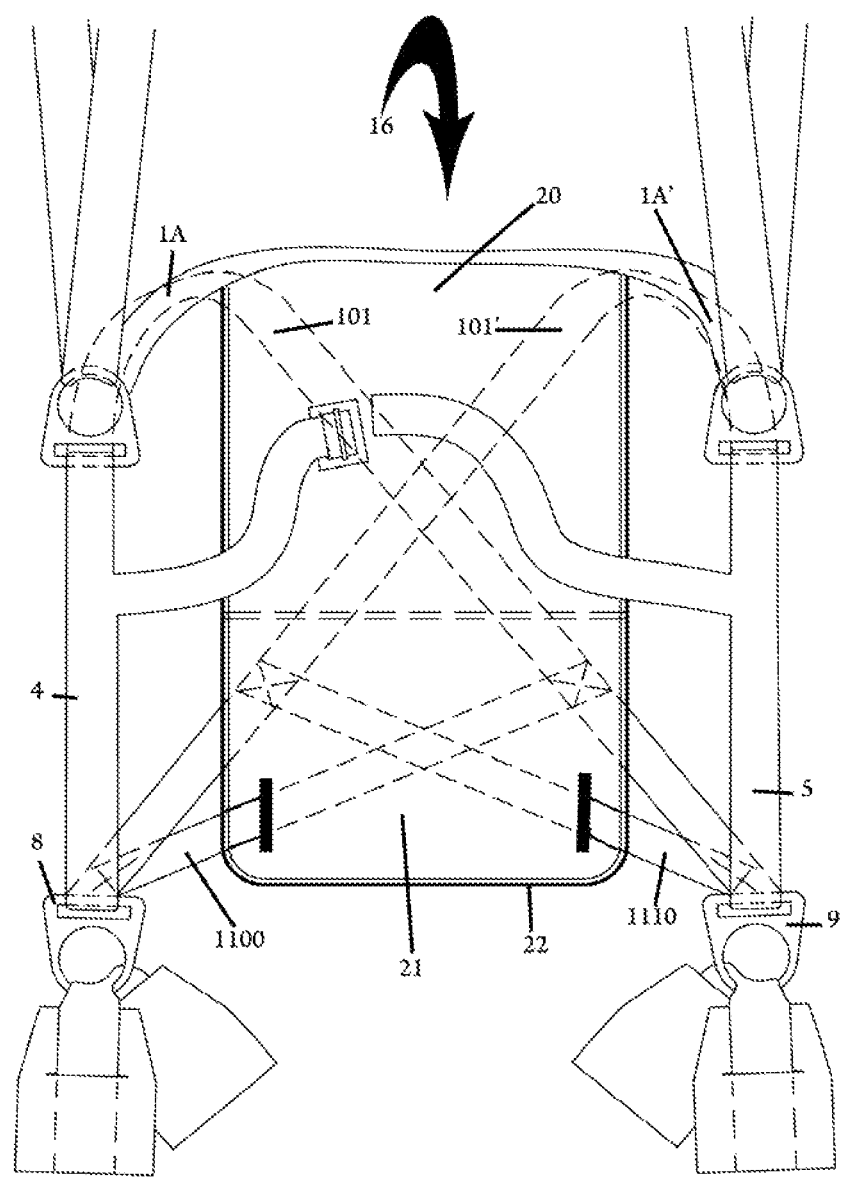

[Fig. 7B]
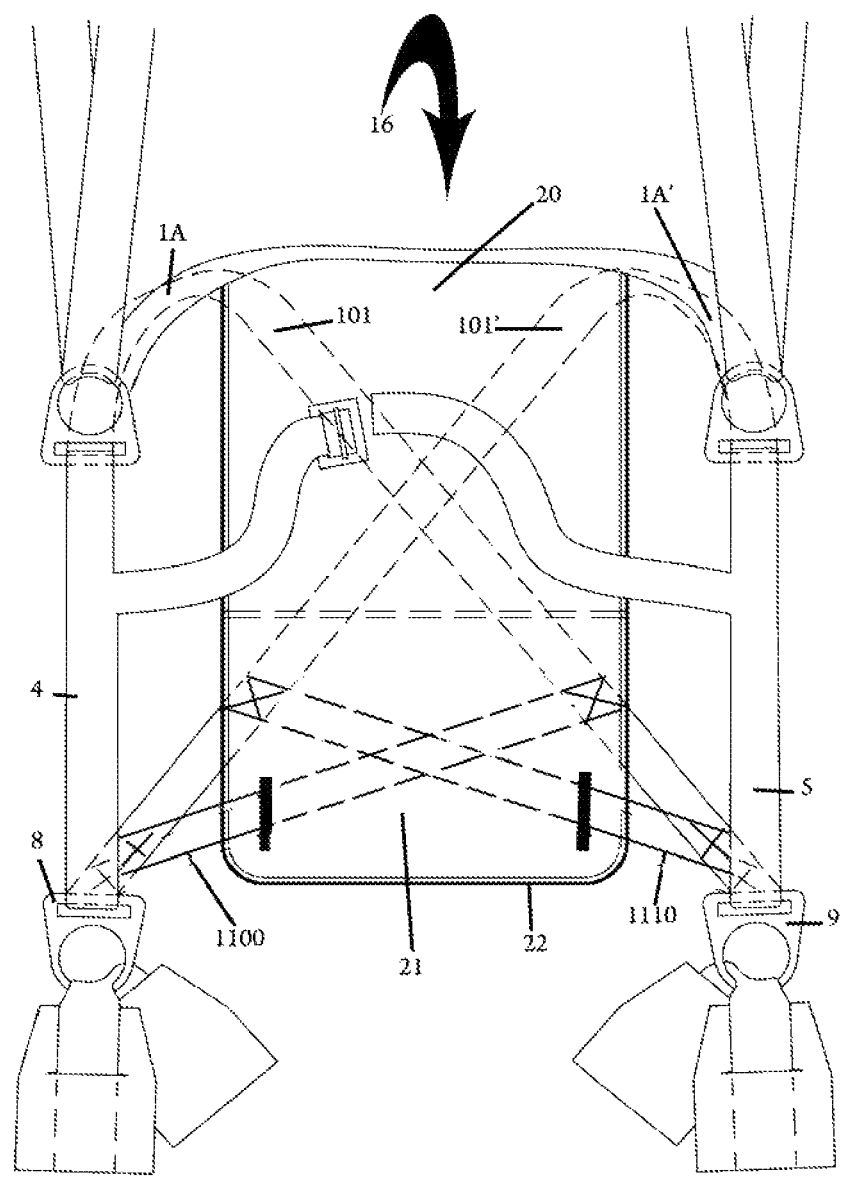

[Fig. 8]
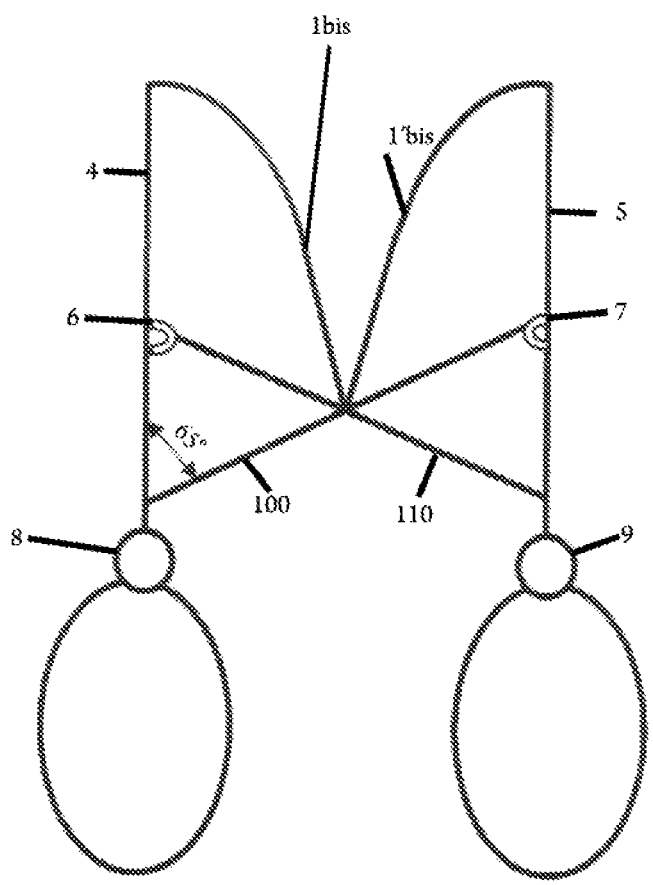

[Fig. 8A]
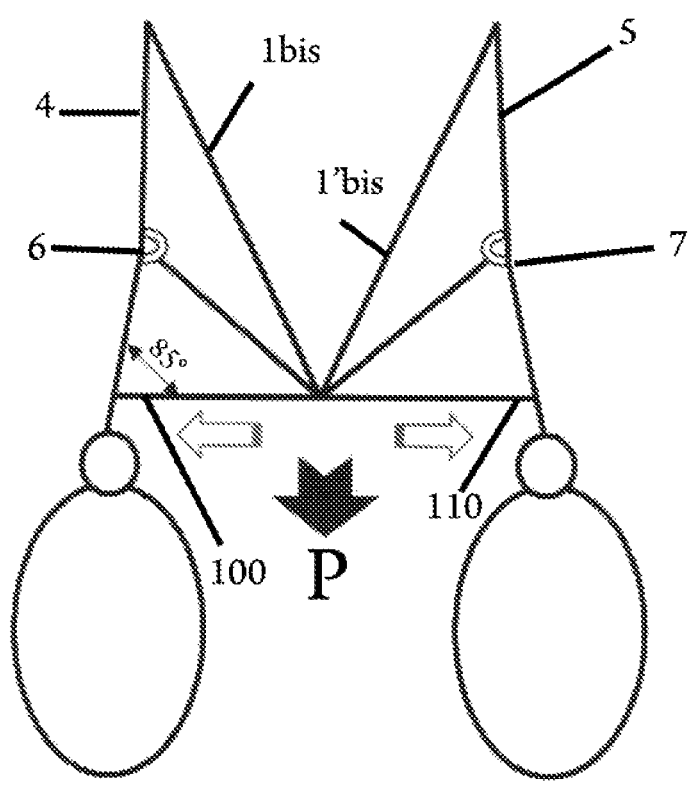

[Fig. 9]
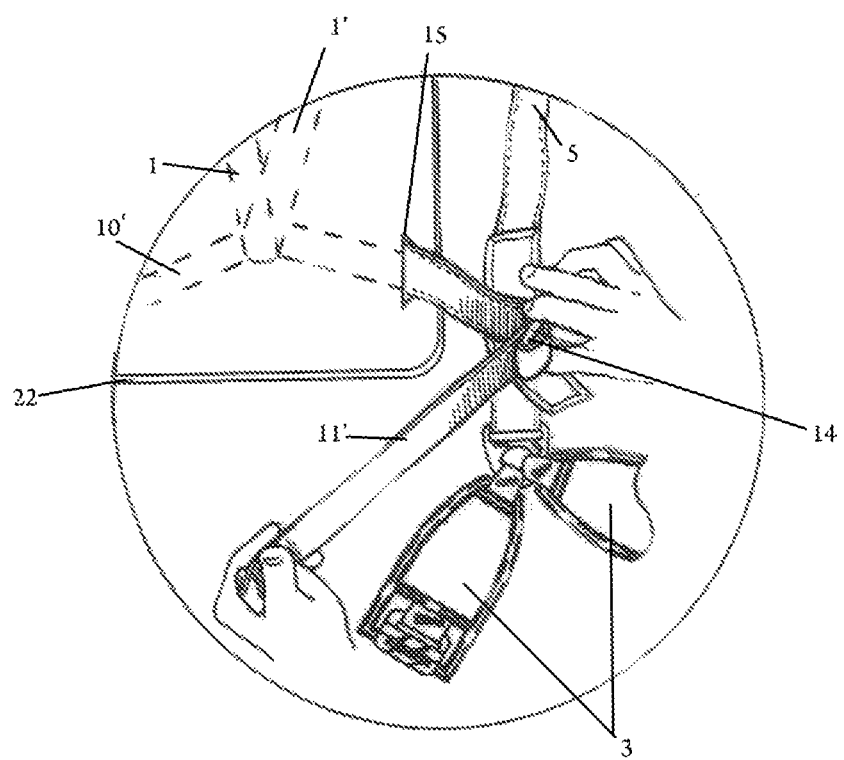

[Fig. 10]
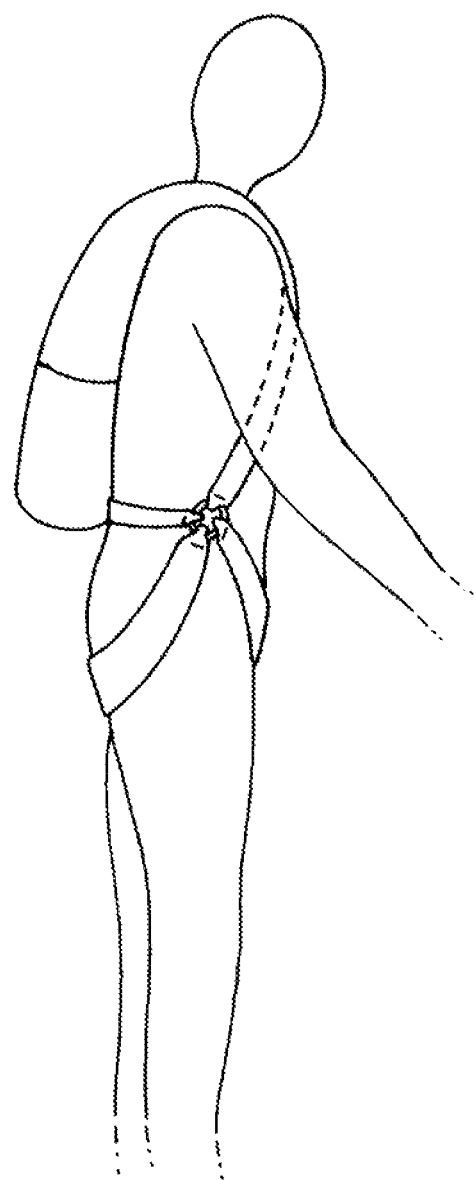

[Fig. 11]
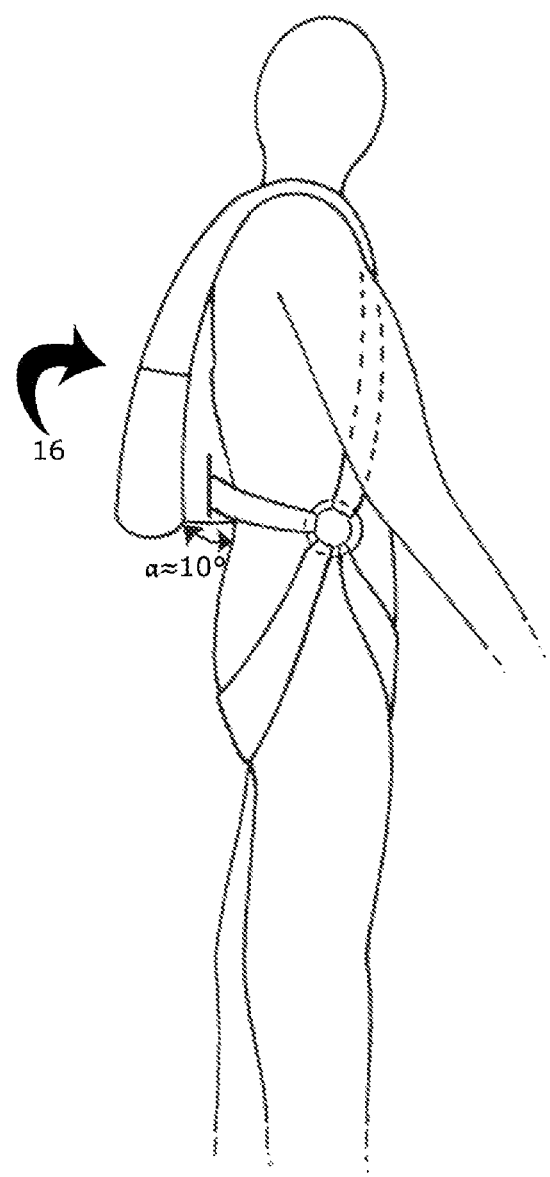

[Fig. 12]
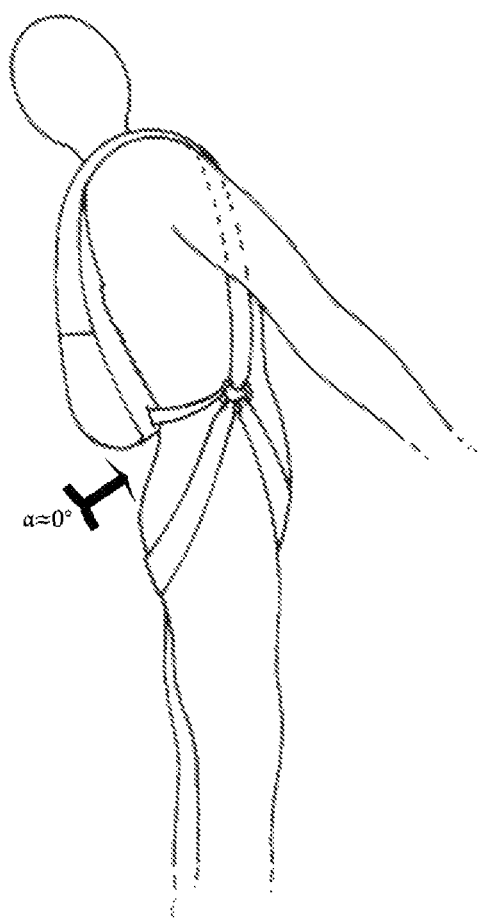

PARACHUTE HARNESS WITH LUMBAR STRAP(S)

This applications claims the priority under 35 USC 119(a) of French patent application FR2201053 filed on Feb. 7, 2022, the entirety of which is incorporated herein by reference.

BACKGROUND OF THE INVENTION

Field of the Invention

A parachute jump equipment is called a "harness-container" and is formed by the harness and the main and reserve canopy containers, the assembly of which is also called a parachute pack because same is located on the back of the parachutist.

The harness-containers used in the activity of parachute jumping serve first for packing the folded main and reserve canopies, and secondly, when the canopy is deployed, for suspending the parachutist.

The invention relates to a harness-container system which advantageously allows the lower back to recoil during open canopy descent, and includes means enabling the parachute to hinder as little as possible the movements of the body, which additionally provides more freedom in the bending or arching movements of the back, than the embodiments of the prior art.

The system supports the parachute pack on the back of the wearer, before opening, and properly restrains the user during the phase of opening the parachute.

The present invention relates to any parachute pack, i.e. when the reserve parachute and the main parachute are both attached onto the back of the parachutist with the container for the reserve parachute in the upper part superimposed on a container for the main parachute in the lower part.

Description of the Related Art

It is well known from such harness-containers, that the reserve container is rigidly attached to the harness by means of a seam of the shoulder straps at the yoke, and the main container is rigidly attached to the harness by webbing material joined together by stitching on the backpad at the lower part of said main container, at a horizontal back strap, located at the lower back of the user.

Such horizontal back strap is fastened laterally to the harness by the visible ends thereof, referred to as lateral fastening straps, either at the lower part of the main lift webs of the harness, above or at the hip articulating rings, or, in the absence of any articulating rings, at the point of junction of the leg straps.

As is known per se in modern harness-containers, the system for thigh support consists of leg straps which are straps for the legs.

Such straps are linked either by means of a hip articulating ring or not, to each main lift web of the harness with the opposite ends of the respective leg straps.

In the prior art, the support of the parachute pack is provided by a perfect fit of the horizontal back strap rigidly attached to the parachute pack at the lower back of the user.

Thus, the lower part of the main container is pressed against the back so that the parachute pack does not move laterally nor longitudinally during free fall movements.

Such arrangement is designed so that the horizontal back strap is linked to the backpad forming the back face of the parachute pack oriented toward the user's back before capturing the main lift webs at each end thereof, thereby providing stability, during free fall, for the parachute pack along the lateral and longitudinal directions and preventing any displacement (the back moving away from the lower portion of the parachute pack).

It is known from the prior art that, after the main parachute opening, the parachute pack is emptied of the volume folded inside the main container.

The suspension of the main canopy from the top of the main lift webs is largely carried over onto the lower ends thereof where the horizontal back strap is attached, which transfers a direct support against the lower back of the parachutist and prevents the recoil of the latter at the back of the harness during open canopy descent.

Such arrangement exists on all known harness-containers, whatever the fastening thereof, i.e. the horizontal back strap is linked either directly to the main lift webs or by means of a hip articulating ring.

The lateral constraint of the horizontal back strap hence prevents the separation between the lower part of the main lift webs, which is directly detrimental to the recoil of the user's lower back during the open canopy descent.

Hence, with the systems of the prior art, after opening and until landing, the parachutist equipped with a harness-container of the prior art occupies a substantially vertical position, position which is well suited for withstanding the shock during opening and is, on the other hand, ill-suited for open canopy descent.

Indeed, the suspension of the body in a vertical position hinders blood circulation and increases drag, whereas a more seated position wherein the lower back recoils, is better for the circulatory system, for comfort in open canopy and for performance.

Unfortunately, it is not possible to adopt such a position with known parachute packs, because the horizontal back strap and the extension thereof on each side in lateral fastening straps have a fixed length defined before the jump according to the morphology of the user and such length is not adjustable during open canopy descent.

In a manner known per se, the horizontal back strap of the harnesses is supported by back straps which are the continuity of the shoulder straps, such so-called secondary straps being mounted concealed in the backpad at the rear of the parachute pack and serve to provide structural support to such parachute pack.

The back straps are generally arranged either in a "V" shape with the tip of the "V" in the center of the horizontal back strap, or as descending in parallel and linked on both sides of the horizontal back strap forming a "U".

In another known mode, the back straps are crossed in the shape of an "X" on both sides of the parachute pack with the center of the "X" at the reserve container, the horizontal back strap consisting of each lower end of the branches of the "X" which are turned over at the lower part of the main container and linked together.

Hence, in the known harness-containers, the arrangement of the horizontal back strap sewn at the lower portion of the parachute pack is designed so as not to give any possible variation in distance between the user's lower back and the main container during free fall movements.

Thus, after the main parachute opening, a dynamic force is transmitted directly from the upper part of the main lift webs to the leg straps through the gravitational effect of the body.

The horizontal back strap is stressed by the back support which results therefrom, which reduces the spacing between the main lift webs and has the consequence of prohibiting the recoil of the user's lower back, forcing the parachutist to maintain the known vertical position until landing.

In the prior art, there are systems allowing sitting within the harness, as shown in documents FR2950606 and FR2727081 of the same inventor, such systems making the construction of the parachute more complex and the solutions proposed as embodiment in the aforementioned documents do not prove to be optimal.

SUMMARY OF THE INVENTION

The main subject matter of the present invention is a lumbar support system consisting of a set of one or two lumbar straps arranged at the rear of the main container having the shape of an inverted "V" with the branches of the inverted "V" widened, and the tip of the inverted "V" configured for being joined, preferentially at the tip of the "V", with close branches formed by the back straps arranged at the rear of the parachute pack.

The branches of the inverted "V" formed by the lumbar strap(s) are adjusted to an identical length, which is defined during construction according to the morphology of the user so that the harness is adjusted when the parachutist puts on the harness according to the invention.

In this way, the combination of the lumbar straps and of the back straps substantially form an "X" with branches of unequal widths, with the center of the "X" located in the main container or adjacent to the wall separating the main container from the reserve container.

The branches of lumbar strap(s) adjusted to the same length can be linked to the back straps by other means.

The lower end of the lumbar strap is either directly or indirectly linked at the lower part of each main lift web either to the hip articulating ring or above or to the point of attachment of the leg straps if no there is no articulating ring.

The arrangement of the lumbar support system consisting of the oblique of the lumbar straps allowing the user, concomitantly, to maintain the lateral and longitudinal support of the container in free fall and makes it possible, after the main parachute opening and under the load of the user, due to the point of attachment thereof on the back straps, located approximately in the middle of the main container, to increase the separation between the main lift webs and thus provide space for the lower back to recoil.

According to a preferred embodiment of the lumbar support system of the invention, each lumbar strap is arranged in the shape of an inverted "V" with a visible section and a section hidden in the backpad at the rear of the main container, with the tip of the inverted "V" located approximately in the center of the main container and linked to the tip of the "V" formed by the back straps.

According to another embodiment of the lumbar support system according to the invention, the inverted "V"-shaped lumbar support is extended, same then consisting of a strap with the lower end linked to the lower part of each main lift web, either above or at the hip articulating ring or, in the absence of a hip articulating ring, at the point of linkage of the leg straps and the upper end directly or indirectly linked to the opposite main lift web of the harness approximately between the lower attachment point of the lumbar strap and the 3-ring system which links the parachute risers.

In such variant of embodiment of the lumbar support system according to the invention, it should be noted that the arrangement of the upper end of the lumbar straps with the main lift webs is possible in combination with a linking component such as a linking loop, said linking loop fastened onto the main lift web of the harness at a distance located midway between the 3-ring system and the fastening point of the lower end of the lumbar strap.

Such variant of embodiment of the lumbar support system of the invention is characterized in that same preferentially includes a metal linking loop with a "D" shape, the linking loop being adapted to receive the upper end of the opposite lumbar strap.

According to such variant of embodiment, the back straps are descending and arranged parallel to the rear of the parachute pack in a manner identical to the invention described in U.S. Pat. No. 5,277,348A, with the end thereof linked to a lumbar support system in the through part thereof concealed in the backpad at the rear of the parachute pack.

According to another variant of embodiment of the lumbar support system of the invention, the lumbar straps are arranged obliquely, each back strap concealed at the rear of the parachute pack being arranged in the shape of an "X", the center of the "X" being located in the reserve container and the lower end of each back strap being linked to an upper end of the lumbar strap in the part thereof concealed in the backpad at the rear of the parachute pack; such a variant forms a double "X" . . . .

According to another variant of embodiment of the lumbar support system of the invention, each back strap concealed at the rear of the parachute pack is arranged in the shape of an "X", with the center of the "X" in the reserve container, and the lower end of each back strap linked at the lower part of the opposite main lift web above or at the hip articulating ring, or, in the absence of an articulating ring, at the point of attachment of the leg straps.

In the same embodiment, each lumbar strap which is a subject matter of the invention is arranged with a lower end linked to the torso support system either at the back strap-main lift web junction, or at the hip articulating ring or at the point of attachment of the leg straps, or at the visible lower end of the back strap, and the upper end of the lumbar strap linked to the opposite back strap.

Another of the features of the system according to the invention is that same makes it possible, in addition, to provide clearance space between the lower portion of the parachute pack and the back of the wearer.

Indeed, in the prior art, the freedom of movement of the user in bending and arching was limited by the adjusted length of the horizontal back strap against the lower back of the user, because the parachute pack is compacted and does not bend to follow the deformations of the spine.

In order to achieve a better result where the parachutist can move relatively freely, free from the strain of the harness-container per se, the applicant provides for a window allowing the lumbar support system to cross through the backpad, such window not being located at the lowest point of the main container, in this way the lower end of the parachute pack staying clear from the lower back.

Such configuration gives the user a significant improvement in arching, compared to the system of the prior art where the lower portion of the parachute pack came directly into contact with the lower back, limiting the arching amplitude, because the parachute pack is rigid when the canopies are folded and thus does not deform before opening.

The subject matter of the present invention is thus a lumbar support system for a parachute harness-container comprising a container to which a harness is attached, the harness comprising a torso support system comprising a front part and a back part, a thigh support system and a lumbar support system, the torso support system being attached to the thigh support system and the lumbar support system, wherein the lumbar support system is attached to the front part of the torso support system by a front link and to the rear part of the torso support system by a rear link, the lumbar support system being deformable between a position before opening and an open canopy position, so that in the position before opening, the rear link is located above the front link with respect to the horizontal.

Thus, in a vertical plane, the rear link is above the front link, which allows the back link, once in the open canopy position, not to descend lower than the horizontal with respect to the front link, so as to provide a more comfortable sitting position in the open canopy descent position.

According to one embodiment, the torso support system comprises first and second straps each comprising a main lift web extending into secondary straps consisting of a shoulder strap and then into a back strap attached to the rear of the container, each of the first and second straps being configured for extending, in use, over a user from a front end of the main lift web located at the lower torso of a user to an end of the back strap, the torso support system further including a detachable chest strap configured for linking the two main lift webs.

According to one embodiment, the back straps have one amongst parallel, crossed and V-shaped configurations.

In one embodiment, the thigh support system includes first and second leg straps, each leg strap being configured for extending around one of the thighs of the user, the leg straps being linked to the torso support system either on or below the front link.

According to one embodiment, the lumbar support system consists of at least one strap having one of an inverted-V or X-shape configuration.

In one embodiment, the back straps of the torso support system have a V-shape configuration, the at least one strap of the lumbar support system having an inverted V-shape configuration, in such a way that the rear link between the torso support system and the lumbar support system consists of the attachment of the V-tip formed by the back straps of the torso support system to the tip of the inverted-V formed by the at least one strap of the lumbar support system, the front link between the torso support system and the lumbar support system consisting of the attachment of the front ends of the main lift webs of the torso support system to the ends of the inverted-V formed by the at least one strap of the lumbar support system.

In one embodiment, the lumbar support system consists of two straps having an inverted V configuration, each strap of the lumbar support system extending beyond the rear link to an additional attachment on the corresponding main lift web, the straps of the lumbar support system forming an X between the front link and the main lift webs.

According to one embodiment, the back straps of the torso support system have a parallel configuration, the lumbar support system consisting of two straps having an X-configuration, in such a way that the rear link between the torso support system and the lumbar support system consists of the attachment of the upper ends of the straps of the lumbar support system to the ends of the back straps of the torso support system, and the front link between the torso support system and the lumbar support system consists of the attachment of the lower ends of the straps of the lumbar support system to the front ends of the main lift webs of the torso support system, the two ends of each strap of the lumbar support system being attached to two different straps of the torso support system.

According to one embodiment, each strap of the lumbar support system extends beyond the rear link to an additional attachment on the corresponding main lift web.

In one embodiment, the back straps of the torso support system have an X-shape configuration, the back straps extending to an attachment on the front end of the opposite main lift web, the lumbar support system consisting of two straps having an X-shape configuration, in such a way that the rear link between the torso support system and the lumbar support system consists of the attachment of the upper ends of the straps of the lumbar support system to the back straps of the torso support system, and the front link between the torso support system and the lumbar support system consists of the attachment of the lower ends of the straps of the lumbar support system to the front ends of the main lift webs of the torso support system, the two ends of each strap of the lumbar support system being attached to the same strap of the torso support system.

BRIEF DESCRIPTION OF DRAWINGS

Other advantages and features will become more clearly apparent from the following description of a plurality of embodiments of the invention, given as non-limiting examples, and represented in the enclosed drawings, wherein:

FIG. 1 is a top view of the arrangement of the main and secondary straps of the prior art before the main parachute opening FIG. 2 is a top view of another embodiment of the prior art before the main parachute opening FIG. 2A is a perspective view of another embodiment of the prior art before the main parachute opening FIG. 3 is a diagram showing the operation of the system of the prior art shown in FIG. 1, before the main parachute opening FIG. 3A is a diagram showing the operation of the system of the prior art shown in FIG. 3, after the main parachute opening FIG. 4 is a perspective view of a parachute equipped with the system according to the invention shown before the main parachute opening.

FIG. 5 is a diagram showing the operation of the system shown in FIG. 4, before the main parachute opening FIG. 5A is a diagram showing the operation of the system shown in FIG. 4, after the main parachute opening FIG. 6 is a ¾ rear view of a parachutist during open canopy descent, equipped with the system according to the invention, as shown in FIG. 4.

FIG. 7 is a top view of a parachute equipped with an improved embodiment of the system according to the invention, shown before the main parachute opening FIG. 7A is a top view of a parachute equipped with another improved embodiment of the system according to the invention, shown before the main parachute opening FIG. 7B is a top view of a parachute equipped with a variant embodiment of the system shown in FIG. 7A

FIG. 8 is a diagram showing the operation of a variant of embodiment of the system shown in FIG. 7, before the main parachute opening FIG. 8A is a diagram showing the operation of the system shown in FIG. 8, after the main parachute opening FIG. 9 is a detailed view of an improvement of the embodiment of the system according to the invention FIG. 10 is a side view of the parachutist equipped with the prior art harness-container on the back of the user in an upright vertical position FIG. 11 is a side view of the parachutist equipped with the system according to the invention, on the back of the user in an upright vertical position FIG. 12 is a side view of the parachutist equipped with the system according to the invention, on the back of the user in the arched position

DESCRIPTION OF THE PREFERRED EMBODIMENTS

The figures are shown on a free scale.

In the following description, identical or similar parts of the different figures are marked with the same reference signs, so as to be able to carry over from one figure to another, except when the embodiment of the invention is different.

In the following description, with regard to straps, the terms "upper and lower" when used in the attachment plane, are understood to be relative to the vertical of the center of the main container and to the usual carrying of the parachute on the user's back, in the same way as the terms right and left are understood when the parachute is on the back of the user.

FIGS. 1, 2 and 2A show the systems of the prior art, the systems being oriented so that the observer faces the rear of the parachute pack.

With reference to FIGS. 1, 2 and 2A, in a manner known per se, the back straps 1 and 1' extend upwards and turn forwards to form the shoulder straps 1A and 1A', respectively, which join the respective main lift webs 4 and 5 thereof.

In the prior art embodiment shown in FIG. 1, where only the harness is shown, the horizontal back strap 2 linked to each of the ends thereof by fastening means at the lower part of the main lift webs 4, 5, can be seen just above the articulating rings 8 and 9.

In the prior art embodiment shown in FIG. 2 where the harness-container is shown, concealed at the rear of the parachute pack 16, the horizontal back strap 2 which serves as a retaining system linked to each of the visible ends thereof called lateral fastening strap 2A, by fastening means to each articulating ring 8 and 9.

The articulating rings 8 and 9 serve as a junction at the beginning of the leg straps 3 and at the lower end of the main lift webs 4 and 5 and are located approximately at the hips as described in U.S. Pat. No. 5,277,348, hence the name hip articulation ring thereof.

The parachute pack 16 shown in FIG. 2 consists, at the rear thereof, in a fabric envelope defined by the term backpad 22.

In a manner known per se, the backpad 22 is fastened by means of a seam at the upper part by the shoulder straps 1A, 1A' and at the lower part shown in dotted lines, on the horizontal back strap 2 concealed in the backpad 22.

In such system of the prior art, the right and left back straps 1 and 1' are arranged separately laterally at the rear of the parachute pack 16 and are wrapped by the lower ends thereof to the horizontal back strap 2, close to the lateral fastening straps 2A in each lower corner of the parachute pack 16, so that same provide structural support for such harness-container.

In another embodiment of the prior art shown in FIG. 2A, the back straps 1 and 1' have an "X" shape concealed at the rear of the parachute pack 16, with the center of the "X" crossing above the vertical wall 18 which separates the reserve container 20 from the main container 21, then the back straps descend at the rear of the parachute pack 16 so as to be fastened to the opposite main lift webs 4 and 5 before returning to link together by the respective ends thereof, so as to form the horizontal strap 2.

The lower ends of the main lift webs 4, 5 form the leg straps 3 which pass outside the thighs and behind the user's buttocks.

In such system of the prior art, the center of the "X" is placed above the wall 18 which separates the reserve container 20 from the main container 21, and the horizontal back strap 2 serves as a support for the structure of the parachute pack 16 during the opening, when the risers 17 transmit the suspension of the parachute to the 3-ring system 23.

In all the systems of the prior art, the recoil of the parachute pack 16 is limited by the length of the horizontal back strap 2 which is defined during the construction of the harness according to the morphology of the user in order to press the parachute pack 16 against the back of the user.

The length of horizontal back strap 2 is chosen for holding the parachute pack 16 stabilized on the back of the user during free fall movements and to keep the parachutist safe during the opening and during the open canopy descent so that the parachutist does not fall back.

So that, as shown in the diagram of the prior art in FIG. 3, the main lift webs 4, 5 and the so-called secondary straps 2, 1, 1' and 3 are represented schematically.

Thus, the leg straps 3 are linked to the articulating rings 8 and 9, attached to the lower end of each main lift web 4 and 5, the latter becoming back straps 1 and 1' positioned in a "V"-shape with the center of the "V" attached in the middle of the horizontal back strap 2.

When the parachutist is equipped with one of the systems of the prior art of the type shown in FIG. 3, the fixed length of the horizontal back strap 2 defines the separation between the main lift webs 4 and 5 on the ground and during free fall movements in order to limit the untimely displacement of the parachute pack on the back of the parachutist.

In the system of the prior art after the opening the main parachute as shown in the diagram in FIG. 3A, under the effect of gravity, identified by P, and of the traction of the main canopy through the top of the main lift webs 4 and 5, the separation of the lower part of the main lift webs is limited by the length given at the construction of the horizontal back strap 2, which length is reduced by the pulling of the user's back support, so that there is a narrowing in distance between the two main lift webs 4 and 5 compared with diagram 3.

As a result of the reduction in the separation between the main lift webs 4 and 5 at the horizontal back strap 2, the recoil of the lower back of the parachutist is not possible during parachute descent.

In this way, after emptying the main container, the parachutist is placed upright with the lower back directly bearing against the horizontal back strap 2.

FIG. 4 shows the preferred and non-limiting embodiment according to the invention wherein the horizontal back strap of the prior art has been eliminated and replaced by a lumbar support system 10, 11.

With reference to FIG. 4, in a manner known per se, the torso support system consists of the upper ends of the right 4 and left 5 main lift web which become right 1A and left 1A' shoulder straps and then form the back straps 1 and 1', right and left, respectively.

The lumbar support system consists of the arrangement of the lumbar straps 10 and 11 diagonally from the lower end, attached by fastening means such as the attachment point 13.

The lumbar straps 10 and 11 are thus linked according to the morphology of the user, by fastening means preferentially located at the lower part of each main lift web 4 and 5 above the articulating rings 8 and 9.

Depending on the size of the user, the lumbar straps 10 and 11 can be attached by fastening means at the lower end thereof to the articulating ring 8 and 9 or, in the absence of an articulating ring, at the junction point of the leg straps 3.

The two lumbar straps 10 and 11 form a "V" with inverted and widened branches, in addition same can form only one and the same strap.

In the embodiment of the lumbar support system shown in FIG. 4, the lumbar straps 10 and 11 cross through the backpad 22 through a window 15 to be concealed behind the parachute pack 16 and connect to the tip of the "V" formed by the junction of the back straps 1 and 1' to which the straps are stitched in one or more places at an intermediate distance located approximately in the middle of the main container 21.

The tip of the inverted "V" formed by the arrangement of the lumbar straps 10 and 11 can be located at the limit of the vertical wall 18 which separates the reserve container 20 from the main container 21.

Thus, the linear length of the lumbar straps 10 and 11 arranged diagonally before the main parachute opening from the point of attachment 13 thereof, will always be greater when same are brought back to the horizontal after the main parachute opening, compared to what would be the only length of a back strap placed at the horizontal of the system of the prior art from the same point of attachment 13.

In this way, when the canopies are folded and after putting on the harness by placing the shoulder straps 1A, 1A' above his/her shoulders and the parachute pack 16 on the back as if same were a jacket or a baldric, the parachutist can position the main lift webs 4 and 5 on his/her chest and put on and tighten the chest strap 12 and the leg straps 3, thus limiting the lateral and longitudinal displacement of the parachute pack 16 during free fall movements.

FIG. 5 shows the diagram of the lumbar support system with the preferred embodiment according to the invention shown in FIG. 4, ready to be placed on the parachutist before the main parachute opening.

In the arrangement shown in FIG. 5, when the harness-container is worn before the main parachute opening, the angle formed between each lumbar strap 10 and 11 and each associated respective main lift web 4 and 5 is approximately 65° before the main parachute opening.

The angle varies according to the descending length given to the "V" formed by the back straps 1 and 1', during the construction of the harness-container according to the invention.

By placing the junction point of the inverted "V" higher in the main container, the angle between the main lift web 4, 5 and the lumbar strap 10, 11 is reduced and vice versa if the junction point of the inverted "V" is placed lower in the main container.

In the above two cases, the length of the back straps 1 and 1' which form the "V" need to be associated therewith in order to be linked to the lumbar straps 10 and 11.

Thus, in order to reduce, in degrees, the angle formed between the main lift web 4 and 5 and the lumbar strap 10 and 11, the tip of the inverted "V" is being raised closer to the vertical wall 18 which separates the main container 21 and the reserve container 20, the angle between each main lift web 4 and 5 and each associated lumbar strap 10 and 11 will approach 45°.

In the latter configuration, the linear length of the associated lumbar straps will be greater than in the example shown in FIG. 5 and hence the possible recoil of the lower back of the user during the open canopy descent will be more significant.

FIG. 5A diagrammatically shows the harness-container according to the invention shown in FIG. 5 in the phase where the parachutist is suspended after the main parachute opening.

Under the load of the user supported by the effect of gravity when the main parachute is deployed, the lumbar support system is deformable due to the freedom of pivoting of the secondary straps.

Consequently, the junction point of the lumbar straps 10, 11 and the back straps 1, 1' is lower than in FIG. 5 and the lumbar straps 10 and 11 occupy a position which is substantially horizontal.

Accordingly, the angle formed between each main lift web 4, 5 and the lumbar straps 10, 11, becomes close to 85°.

In such configuration during open canopy descent, the lengths of the lumbar straps 10, 11 being linearly added, the separation between the main lift webs 4, 5 at the articulating rings 8, 9, becomes greater, as shown in FIG. 5A, compared with the separation in the diagram shown in FIG. 3A, the separation of the main lift webs 4, 5 allowing the lower back to recoil during open canopy descent, as shown in FIG. 6.

FIG. 6 shows the preferred embodiment according to the invention by showing the parachutist in a ¾ rear view during open canopy descent, the parachutist being suspended by the risers 17 from a canopy not shown.

When the canopy of the main parachute is deployed, there is a sudden deceleration of the parachutist's speed of fall.

In a manner known per se, the resultant of the application of the forces transmitted by the risers 17 is supported mainly by the main lift webs 4, 5 and the leg straps 3 whereas only 15% of the forces are supported by the back straps 1, 1' and the lumbar straps 10, 11.

In such preferred embodiment of the lumbar support system according to the invention, the lower part of the body is moved back and slightly inclined backwards; to reach such position, the parachutist has benefited from the horizontal tensioning of the lumbar straps 10, 11.

The transposition of the lengths of each of the straps 10, 11 from the diagonal to the horizontal favors the separation of the main lift webs 4, 5 and allows the lower back to recoil.

In an improved embodiment of the invention, as shown in FIG. 7, the lumbar support system of the harness-container according to the invention is similar to same shown in FIG. 4, except that the lumbar straps 100 and 110 cross through on both sides of the parachute pack 16.

The arrangement of the lumbar support system according to the invention comprises in particular, the two lumbar straps 100, 110 which extend from the hip articulating rings 8, 9 to the linking loops 6, 7 after having crossed through a window 15 located in the backpad 22 and having crossed at the rear of the parachute pack 16 at the main container 21 so as to be linked at the upper ends thereof to the opposite vertical straps.

The crossing of the lumbar straps 100, 110 takes place substantially at the center of the main container 21.

Also, the arrangement of the right 1bis and left 1'bis back straps differs, meaning that same are shown parallel at the rear of the parachute pack 16.

The main lift webs 4, 5 are each equipped with a linking loop 6, 7, located between the 3-ring system 23 and the hip articulating rings 8, 9, slightly below the chest strap 12.

Said linking loops 6 and 7 are preferentially made of metal and have a "D" shape, e.g. with a straight 50 mm long part, dimensioned for receiving each upper end of the lumbar strap 100 and 110.

Such usable length for fastening to the main lift webs 4 and 5 is determined so as to provide a sufficient sliding stroke of the lumbar straps 100 and 110.

The use of loops with the shape of an arc of a circle allows the lumbar straps 100, 110 to pivot simply by sliding said straps along the arched loops.

In such configuration, the vertical straps 1*bis*, 1'*bis* mounted in parallel at the rear of the parachute pack 16, establish a relatively straight load alignment from the end of each shoulder strap 1A, 1A' and extending top down to the respective fastening points thereof and away, located on the main container 21, wrapped by stitching at the lower ends thereof at spaced locations along each lumbar strap 100 and 110.

Thus, the operation during the open canopy descent of the harness-container shown in FIG. 7 is similar to the operation shown for the harness-container in FIG. 6 except that the support of the parachute pack 16 during free-fall movements is improved by the additional presence of the fasteners at the upper ends of the lumbar straps 100, 110 at each opposite main lift web 4, 5 through the linking loops 6 and 7.

FIG. 7A shows another improved embodiment of the lumbar support system according to the invention, in which the back straps 101 and 101' are crossed on the reserve container 20 and pass through the rear of the parachute pack 16 to appear at the main container 21 before being fixed at the lower part of the opposite main lift webs 4 and 5.

The lumbar straps 1100 and 1110, which are the subject matter of the invention, are rigidly attached by a lower end to the main lift webs 4, 5 and by another upper end, at the rear of the parachute pack 16, to the back straps 101, 101' at an intermediate distance located in-between the articulating rings 8, 9 and the shoulder straps 1A, 1A'.

It should be noted that other combinations of the lumbar support system are possible, such as the lower fastening of the lumbar straps 1100, 1110 to the articulating rings 8, 9 or to the lower end of the back straps 101, 101', as shown in FIG. 7B.

In the absence of articulating rings, the back straps will be linked to the point of attachment of the leg straps whereas the lumbar straps can be attached, indifferently, to the point of attachment of the leg straps, or, as shown in FIG. 7B, to the lower end of the back straps 101, 101'.

Diagram 8 shows a variant of the improved mode of the system according to the invention shown in FIG. 7, before the main parachute opening.

The embodiment of diagram 8 differs from the lumbar support system shown in FIG. 7 in that the back straps 1*bis* and 1'*bis* are not arranged in parallel but in a "V" shape at the rear of the parachute pack, with the tip of the "V" attached to the crossing of the lumbar straps 100 and 110.

So that, as shown in diagram 8A which schematically shows the deformable movement of the lumbar support system after the main parachute opening, the space freed by the emptying of the main container 21 allows each lumbar strap 100; 110 to take a horizontal orientation, which gives the main lift webs 4, 5 freedom to move apart from one another so as to allow the user's lower back to recoil.

Indeed, the angle between the main lift webs 4, 5 and the lumbar straps 100, 110 goes from about 65° before the main parachute opening, as shown in diagram 8, to about 85° after the main parachute opening under the effect of gravity represented by P, as shown in diagram 8A.

The pivoting can take place in a plane passing through the main lift webs 4, 5, referred to as the "attachment plane", the change of orientation of the lumbar straps making possible more separation between the main lift webs 4, 5 and freeing up space which is immediately filled by the recoil of the user's lower back.

As shown in diagram 8A, the grip of the lumbar straps 100 and 110 on the main lift webs 4, 5 is such that same are pulled downwards under the stress of the weight of the body represented by P, and provide the possibility of sliding of the point of attachment thereof along the arched linking loops 6, 7.

In the embodiment shown in FIG. 9, showing an improved system of the lumbar support system of the invention, a construction detail is shown, arranged on the main lift web above the articulating ring 9, consisting of a means of adjusting the length of the lumbar strap 11'.

The adjustment means consists of an adjustment buckle 14 intended for this purpose, so as to freely adjust the length of lumbar strap 11'.

In a manner not shown in FIG. 9, an identical adjustment buckle 14 is arranged on the opposite main lift web 4 for the length adjustment of the lumbar strap 10'.

In this way, it is possible to adapt on the ground the usable length of the lumbar straps 10', 11' to the morphology of each user rather than to define a fixed length of lumbar strap during construction.

In operation, when the parachutist puts on the harness according to the invention, the parachutist will adjust the length of the respective lumbar straps 10', 11' via the adjustment buckle 14 so as to adapt the length to the body size of the parachutist and to arrange the articulating rings 8; 9 in the desired position.

As shown in FIG. 9, it is enough to pass some slack of the lumbar strap 11' through the loop of the adjustment buckle 14 provided for this purpose, ensuring the user's comfort and maintaining the excess of the lumbar strap 11' in the housing thereof.

FIG. 10 shows one of the systems of the prior art shown in FIG. 1, 2 or 2A on the back of the user in the so-called "neutral" vertical station position where the lower portion of the parachute pack 16 directly presses against the lower back of the back of the user, a configuration which limits the back arch when back arching is required for free-fall movements.

In fact, the strict fastening of the lower portion of the parachute pack rigidly attached to the harness by a horizontal back strap 2 of a length calculated to be pressed against the lower back of the wearer, in order to provide stability to the parachute pack 16 in the lateral and longitudinal directions, prevents any deflection (the back recoil), which accordingly limits the user's freedom of movement under bending and arching because the modern parachute pack is not flexible and does not bend to follow the deformations of the spine.

FIG. 11 shows the lumbar support system according to the invention, of the type shown in FIG. 4, on the back of the user in the so-called "neutral" vertical standing position where the lower portion of the parachute pack 16 is detached from the back, as illustrated by an angle alpha of about 10°.

In FIG. 12, the lumbar support system according to the invention, as shown in operation in an arching movement of the user, allows especially the lower portion of the parachute pack 16 to press against a zone located at the small of the back of the wearer. Thus, when the parachutist arches his/her back, as shown in FIG. 12, the lower portion of the parachute pack 16, which was slightly detached from the contact of the back as shown in FIG. 11, comes closer to the small of the parachutist's back, the lower side of the rear of the parachute pack 16 being pressed against the back of the wearer, the angle alpha approaching 0°.

The harness according to the invention is not limited to the proposed construction where the lumbar straps 10, 10', 11, 11', 100, 110, 1100, 1110 cross through the backpad 22 via windows 15.

In a variant (not shown) of the embodiment of the system of the lumbar support system according to the invention, as shown in FIG. 7, in the absence of a linking loop 6 and 7, the upper ends of the lumbar straps 100, 110 are mechanically linked by wrapping the associated main lift web 4 and 5.

The fastening means of the upper ends of the lumbar straps 100 and 110 are provided at a height preferentially located at the chest strap 12 so as to allow the pivoting of the lumbar straps 100 and 110 to take place in the direction of the forces and to allow occurrence of a modification of the angle same form with the vertical straps 4 and 5.

In another variant of the embodiment of the system according to the invention, as shown in FIG. 7, the back straps 1bis and 1'bis are not parallel but are crossed at the rear of the parachute pack so as to be linked by the respective ends thereof to each lumbar strap 100 and 110.

The parachute pack 16 can be rigidly attached to the lumbar straps by stitching, gluing or high frequency welding, if the material forming the parachute pack is heat-sealable.

Of course, the invention is not limited to the embodiments described and shown as examples, but the invention further comprises all technical equivalents and combinations thereof.

Nevertheless, it follows from the foregoing that the invention is not limited to the means of implementation which have been specifically described and shown in the figures and that the invention extends to any variant using equivalent means.

REFERENCE NUMBERS 1 right back strap
1A right shoulder strap
1' left back strap
1A' left shoulder strap
1bis right back strap
1'bis left back strap
2 horizontal back strap
2A lateral fastening strap
3 leg strap
4 right main lift web
5 left main lift web
6 right linking loop
7 left linking loop
8 right hip articulating ring
9 left hip articulating ring
10 right lumbar strap
10' right lumbar strap
11 left lumbar strap
11' left lumbar strap
12 chest strap
13 point of attachment of lumbar straps
14 lumbar strap adjustment buckle
15 lumbar strap window
16 parachute pack
17 risers
18 vertical separation wall
20 reserve container
21 main container
22 backpad
23 3-ring system
100 right lumbar strap
101 right back strap
101' left back strap
110 left lumbar strap
1100 right lumbar strap
1110 left lumbar strap
P Weight

The invention claimed is:

1. A parachute harness-container comprising a container to which a harness is attached, the harness comprising a torso support system comprising a front part and a rear part, a thigh support system and a lumbar support system, the torso support system being attached to the thigh support system and the lumbar support system, wherein the lumbar support system is attached to the front part of the torso support system by a front link and to the rear of the torso support system by a rear link, the lumbar support system being deformable between a position before opening and an open canopy position, so that in the position before opening, the rear link is located above the front link with respect to the horizontal.

2. The harness-container according to claim 1, wherein the torso support system comprises first and second straps each comprising a main lift web extending into a shoulder strap and then into a back strap attached to the rear of the container, each of the first and second straps being configured for extending, in use, over a user from a front end of the main lift web located at the torso of a user to an end of the back strap.

3. The harness-container according to claim 2, wherein the back straps have one configuration amongst parallel, crossed and V-shape configurations.

4. The harness-container according to claim 1, wherein the thigh support system comprises first and second leg straps, each leg strap being configured for extending around one of the thighs of the user, the leg straps being linked to the torso support system at one of on and below the front link.

5. The harness-container according to claim 1, wherein the lumbar support system consists of at least one strap having one configuration amongst an inverted V or an X configuration.

6. The harness-container according to claim 5, wherein the back straps of the torso support system have a V-shape configuration, the at least one strap of the lumbar support system having an inverted V-shape configuration, in such a way that the rear link between the torso support system and the lumbar support system consists of the attachment of the V-tip formed by the back straps of the torso support system to the tip of the inverted-V formed by the at least one strap of the lumbar support system, the front link between the torso support system and the lumbar support system consisting of the attachment of the front ends of the main lift webs of the torso support system to the ends of the inverted-V formed by the at least one strap of the lumbar support system.

7. The harness-container according to claim 6, wherein the lumbar support system consists of two straps having an inverted-V configuration, each strap of the lumbar support system extending beyond the rear link to an additional attachment onto the corresponding main lift web.

8. The harness-container according to claim 5, wherein the back straps of the torso support system have a parallel configuration, the lumbar support system consisting of two straps having an X-shape configuration, such that the rear link between the torso support system and the lumbar support system, consists of the attachment of the upper ends of the straps of the lumbar support system to the ends of the back straps of the torso support system, and the front link between the torso support system and the lumbar support system consists of the attachment of the lower ends of the straps of the lumbar support system to the front ends of the main lift webs of the torso support system, the two ends of each strap of the lumbar support system being attached to two different straps of the torso support system.

9. The harness-container according to claim 8, wherein each strap of the lumbar support system extends beyond the rear link to an additional attachment onto the corresponding main lift web.

10. The harness-container according to claim 5, wherein the back straps of the torso support system have an X-shape configuration, the back straps extending to an attachment onto the front end of the opposite main lift web, the lumbar support system consisting of two X-shape straps, in such a way that the rear link between the torso support system and the lumbar support system consists of the attachment of the upper ends of the straps of the lumbar support system to the back straps of the torso support system, and the front link between the torso support system and the lumbar support system consists of the attachment of the lower ends of the straps of the lumbar support system to the front ends of the main lift webs of the torso support system, the two ends of each strap of the lumbar support system being fastened to a same strap of the torso support system.

11. The harness-container of claim 2, wherein the torso support system further comprises a detachable chest strap configured for linking the two main lift webs.

12. The harness-container according to claim 11, wherein the back straps have one configuration amongst parallel, crossed and V-shape configurations.

* * * * *